United States Patent
Assoumane et al.

(10) Patent No.: US 12,140,217 B2
(45) Date of Patent: Nov. 12, 2024

(54) METHOD FOR MONITORING WEAR OF AN ACTUATOR

(71) Applicants: SAFRAN, Paris (FR); SAFRAN ELECTRONICS & DEFENSE, Paris (FR)

(72) Inventors: Amadou Assoumane, Moissy-Cramayel (FR); Mohammed El Badaoui, Moissy-Cramayel (FR); Badr Mansouri, Moissy-Cramayel (FR); Audrey Venon, Moissy-Cramayel (FR)

(73) Assignees: SAFRAN, Paris (FR); SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 18/256,827

(22) PCT Filed: Dec. 13, 2021

(86) PCT No.: PCT/FR2021/052300
§ 371 (c)(1),
(2) Date: Jun. 9, 2023

(87) PCT Pub. No.: WO2022/129762
PCT Pub. Date: Jun. 23, 2022

(65) Prior Publication Data
US 2024/0026962 A1    Jan. 25, 2024

(30) Foreign Application Priority Data
Dec. 14, 2020   (FR) ..................................... 2013216

(51) Int. Cl.
*F16H 57/01*      (2012.01)
*F16H 25/22*      (2006.01)

(52) U.S. Cl.
CPC .......... *F16H 57/01* (2013.01); *F16H 25/2214* (2013.01)

(58) Field of Classification Search
CPC ............................. F16H 57/01; F16H 25/2214
(Continued)

(56) References Cited

U.S. PATENT DOCUMENTS 4,083,518 A * 4/1978 Garrison ................. G01L 3/101
                                                             416/61
4,774,845 A * 10/1988 Barbe ..................... G01L 3/101
                                                             73/862.328
(Continued)

FOREIGN PATENT DOCUMENTS

| EP | 2500267 A1 | 9/2012 |
| JP | 2013-257253 A | 12/2013 |
| WO | 2016/116332 A1 | 7/2016 |

OTHER PUBLICATIONS

International Search Report received for PCT Patent Application No. PCT/FR2021/052300, mailed on May 4, 2022, 5 pages (2 pages of English Translation and 3 pages of Original Document).

*Primary Examiner* — Ha Dinh Ho
(74) *Attorney, Agent, or Firm* — WOMBLE BOND DICKINSON (US) LLP

(57) ABSTRACT

A method includes for each of the portions of a guide of the actuator, obtaining an operating signal measured when a movable element of the actuator travels over the guide portion in question, upon each of a plurality of successive activations of the actuator; for each of the guide portions, seeking wear of the actuator from the operating signals obtained for this guide portion; and locating the wear on the guide or on the motor according to the guide portions from which the wear has been found.

12 Claims, 6 Drawing Sheets

(58) Field of Classification Search
USPC .......................................................... 74/335
See application file for complete search history.

(56) References Cited

U.S. PATENT DOCUMENTS

| | | | | |
|---|---|---|---|---|
| 5,009,128 | A * | 4/1991 | Seidel | F16H 63/42 |
| | | | | 701/52 |
| 5,957,806 | A * | 9/1999 | Hirose | B60W 30/1819 |
| | | | | 477/79 |
| 6,879,885 | B2 * | 4/2005 | Driscoll | B64D 31/06 |
| | | | | 73/527 |
| 8,893,571 | B2 * | 11/2014 | Rouleau | F16H 59/68 |
| | | | | 74/473.15 |
| 10,496,787 | B2 * | 12/2019 | Tucker | G06F 30/15 |
| 2012/0078544 | A1 * | 3/2012 | Lynch | B64C 27/008 |
| | | | | 702/56 |
| 2012/0239244 | A1 | 9/2012 | Costes et al. | |

* cited by examiner

[Fig. 1]
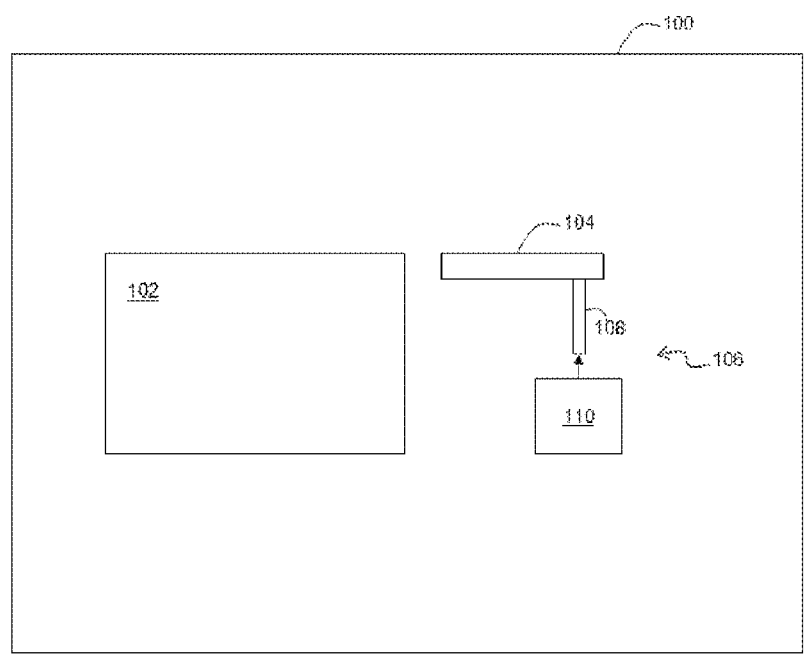

[Fig. 2]
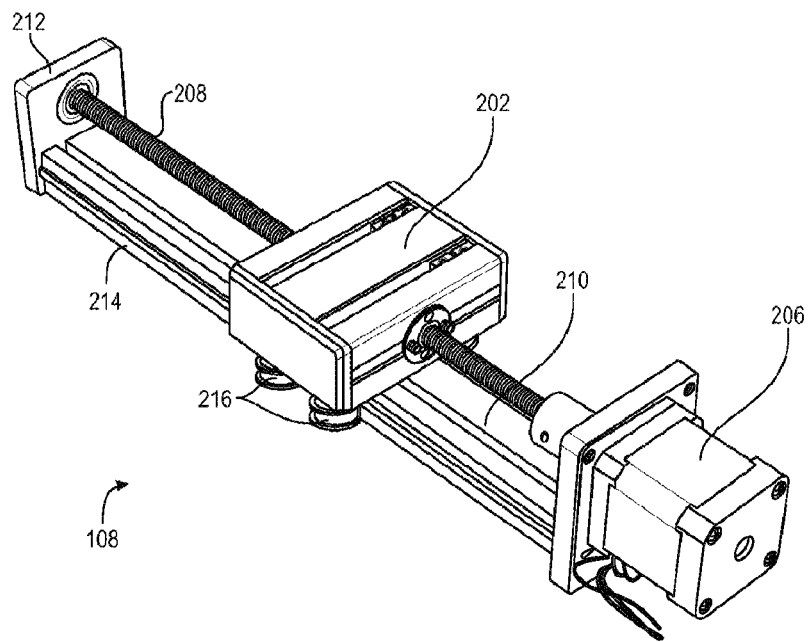

[Fig. 3]
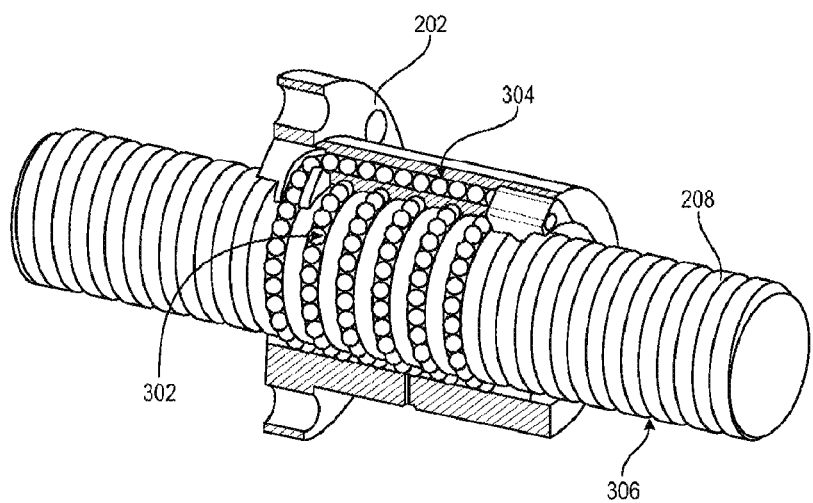

[Fig. 4]
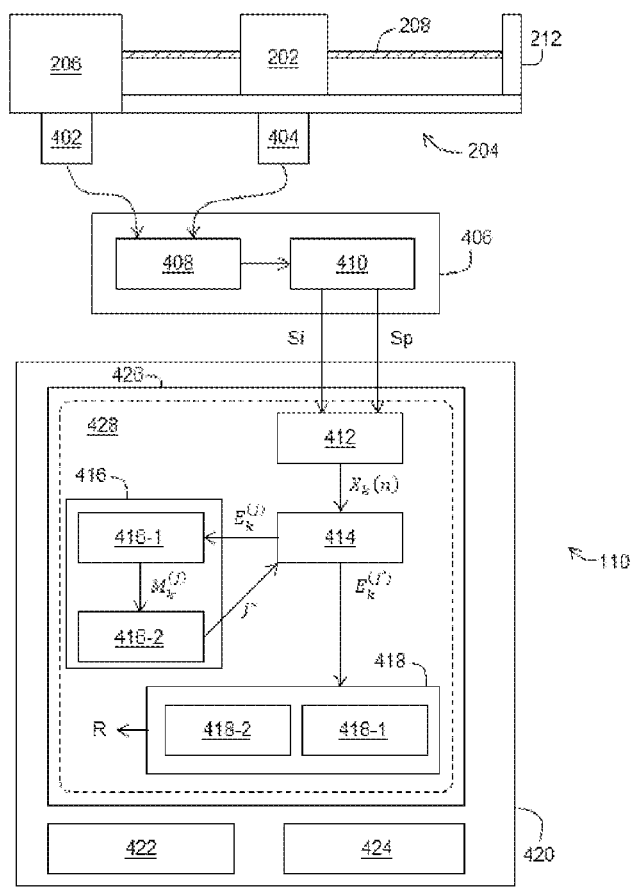

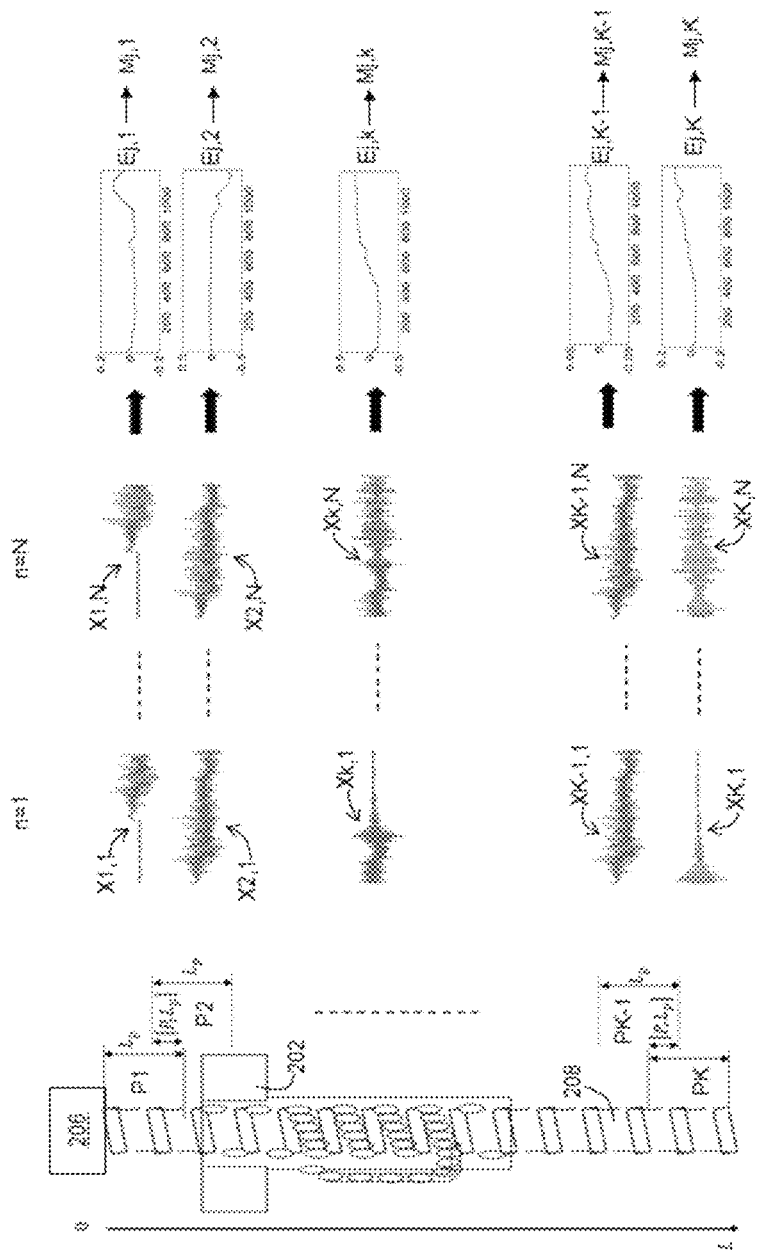
[Fig. 5]

[Fig. 6]
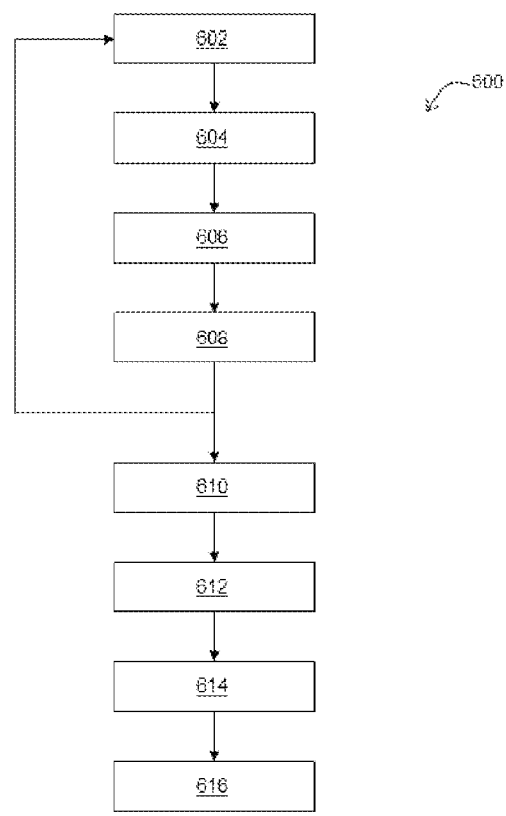

METHOD FOR MONITORING WEAR OF AN ACTUATOR

TECHNICAL FIELD OF THE INVENTION

The present invention relates to a method for monitoring wear of an actuator and an associated computer program, as well as to a corresponding monitoring system and an actuation system comprising such a monitoring system.

TECHNOLOGICAL BACKGROUND

A method for monitoring wear in an actuator comprising a movable element, a guide for guiding the movable element and a motor for driving the movable element along the guide is known in the prior art, this monitoring method comprising determining an evolution in a wear indicator during successive activations of the actuator and detecting wear if the evolution in the wear indicator meets a wear criterion.

However, this known monitoring system can only allow to detect the presence of wear in the actuator and not its location.

It may therefore be desirable to provide a method for monitoring wear of an actuator which allows to avoid at least some of the above problems and constraints.

SUMMARY OF THE INVENTION

To this end, a method is proposed for monitoring an actuator comprising a movable element, a guide for guiding the movable element and a motor for driving the movable element along the guide, this method being characterised in that it comprises:

for each of the portions of the guide, obtaining an operating signal measured when the movable element travels along the guide portion in question, on each of several successive activations of the actuator;

for each of the guide portions, seeking wear of the actuator from the operating signals obtained for that guide portion; and locating the wear on the guide or on the motor according to the guide portions from which the wear is found.

Thus, thanks to the invention, it is possible to distinguish between wear of the motor and wear of the guide.

Advantageously, wear is located on the guide when wear of the actuator is found only on some guide portions.

Also advantageously, wear is located on the motor when wear of the actuator is found on all guide portions Advantageously also, the guide being divided into elementary portions, each guide portion is formed either by a respective one of the elementary portions or by several elementary portions, for example successive along the guide, the elementary portions being able to overlap to have for example samples in common or to be distinct from each other.

Advantageously also, each guide portion comprises two consecutive elementary guide portions, each operating signal comprises two elementary operating signals measured as the movable element travels along the two elementary guide portions respectively, the method further comprising:

analysing each elementary operating signal to determine a value for a wear indicator;

and seeking for wear of the actuator for each of the guide portions comprises:

carrying out a data clustering on points respectively associated with the activations of the actuator, each point having as coordinates the two values of the wear indicator of the two consecutive elementary guide portions for the associated activation, in order to obtain a number of cluster for the considered guide portion; and detecting wear for the guide portion under consideration if several clusters are obtained.

Advantageously also, each guide portion is formed of an elementary guide portion, the method further comprising:

analysing each operating signal to determine a value for a wear indicator; and seeking for wear of the actuator for each of the guide portions comprises:

analysing a variation in the wear indicator during successive activations; and detecting wear for the guide portion under consideration from the analysis of the variation.

Advantageously, the analysis of the variation in the wear indicator also comprises comparing the variation in the wear indicator to a threshold.

Also proposed is a computer program downloadable from a communication network and/or stored on a computer-readable medium, characterised in that it comprises instructions for the execution of the steps of a monitoring method according to the invention, when said program is executed on a computer Also proposed is a system for monitoring an actuator comprising a movable element, a guide for guiding the movable element and a motor for driving the movable element along the guide, this monitoring system being characterised in that it is designed to implement a method according to the invention.

Also proposed is an actuation system comprising:

an actuator comprising a movable element, a guide for guiding the movable element and a motor for driving the movable element along the guide; and a system for monitoring wear of the actuator, according to the invention.

Also proposed is an aircraft with an actuation system according to the invention, for example for displacing a thrust reverser flap.

BRIEF DESCRIPTION OF THE FIGURES

The invention will be better understood with the aid of the following description, given only by way of example and made with reference to the attached drawings in which:

FIG. 1 is a highly simplified view of an aircraft according to the invention, comprising an actuator and a system for monitoring wear of the actuator, FIG. 2 is a three-dimensional view of an example of the actuator of FIG. 1, FIG. 3 is a three-dimensional view of an example of movable element of the actuator of FIG. 2, FIG. 4 is a schematic view of an example of monitoring system of FIG. 1, FIG. 5 is a view showing the data processed in the monitoring system of FIG. 4, and FIG. 6 is a block diagram illustrating the steps of an example of a method according to the invention for monitoring wear of an actuator.

DETAILED DESCRIPTION OF THE INVENTION

With reference to FIG. 1, an example of an aircraft 100 according to the invention will now be described.

The aircraft 100 firstly comprises a turbomachine 102 designed to produce a thrust in order to displace the aircraft 100.

The aircraft 100 further comprises an actuatable element 104 such as a thrust reverser flap designed to selectively assume an inactive position and a thrust reversal position. In the inactive position, the thrust reverser flap allows the thrust to be directed towards the rear of the aircraft 100 to propel it forward. In the thrust reversal position, the thrust reverser flap is designed to redirect at least some of the thrust forward of the aircraft to brake it. Alternatively, the actuatable element 104 could be part of any primary flight control system (spoiler, horizontal plane stabiliser, flap, wing, etc.).

The aircraft 100 further comprises a system 106 for actuating the actuatable element 104.

The actuation system 106 comprises an actuator 108 and a system 110 for monitoring wear of the actuator 108.

With reference to FIG. 2, an example of an embodiment of the actuator 108 will now be described.

The actuator 108 comprises a movable element 202, a guide 204 for guiding the movable element 202 and a motor 206 for driving the movable element 202. The movable element 202 is mechanically connected to the actuatable element 104 to displace the latter when the movable element 202 moves.

In the example described, the guide 204 comprises a screw 208 driven in rotation at a first end by the motor 206. In addition, the actuator 108 comprises a stationary frame 210 to which the motor 206 is attached and having a rolling bearing 212 holding a second end of the screw 208. The guide 204 further comprises rails 214 extending along the screw and attached to the stationary frame 210.

Also in the example described, the movable element 202 is screwed onto the screw 208 and has wheels 216 engaged in the rails 214 to allow the movable element 202 to move along the screw 208 while preventing it from rotating about the screw 208. Thus, the movable element 202 is designed to translate between a first position close to the motor 206 and a second position close to the roller bearing 212.

With reference to FIG. 3, in the example described, the movable element 202 is a ball recirculator comprising balls 302 and a ball recirculation conduit 304 between two positions of a helical gorge 306 delimited by a thread of the screw 208. Thus, as the screw 208 rotates, the balls are circulated through the gorge 306 and the recirculation conduit 304, in a closed circuit, so as to advance the movable element 202.

With reference to FIG. 4, an example of an embodiment of the monitoring system 110 will be described in more detail.

The monitoring system 110 firstly comprises an operating sensor 402 designed to measure a physical quantity representative of the operation of the actuator 108. In the example described, the operating sensor 402 is designed to measure at least one current of the motor 206 when the motor 206 is an electric motor, such as at least one phase current. For example, in the case of a three-phase electric motor, all three phase currents can be measured. Alternatively, the sensor 402 could be designed to measure a mechanical vibration of the actuator 108. In this case, the sensor 402 may comprise an accelerometer attached to the movable element 202 and/or the rolling bearing 212 to reduce measurement noise.

The monitoring system 110 further comprises a position sensor 404 designed to measure the position of the movable element 202 along the guide 204.

The monitoring system 110 further comprises an acquisition system 406 designed to acquire the measurements of the quantity representative of the operation of the actuator 108 and the position measurements of the movable element 202, respectively provided by the sensors 402 and 404. The acquisition system 406 is thus designed to provide an operating signal Si for operating the actuator 108 from the measurements of the physical operating quantity and a position signal Sp for the position of the movable element 202 from the position measurements. In the example described, the acquisition system 406 firstly comprises a conditioner 408 designed to amplify, attenuate and/or filter the measurements in order to render signals with good accuracy. For example, the conditioner 408 comprises an anti-aliasing filter so that the acquisition respects Shannon's theorem that the maximum frequency of the signal should be less than half the sampling frequency.

The acquisition system 406 further comprises an analogue-to-digital converter 410 designed to provide the operating Si and position Sp signals in digital form.

The monitoring system 110 further comprises a signal segmentation module 412 designed to receive the operating Si and position Sp signals at each of a predefined number N of successive activations of the actuator 108. In the following, the letter "n" will be used to index these successive activations, n thus varying from 1 to N. The segmentation module 412 is thus designed to extract from the operating signal Si, upon each activation n of the actuator 108, segments $X_k(n)$ of this operating signal Si, measured when the movable element 202 travels, according to the position signal Sp, respectively along predefined portions $P_k$ of the guide 204. Alternatively, a position signal Sp may not be used, in particular when the stroke of the movable element 202 is known. In this case, the segments $X_k(n)$ are formed, for example, by predefined intervals in the operating signal Si.

An example of how to define guide portions $P_k$ is shown in FIG. 5.

As can be seen in this figure, the movable element 202 is designed to travel a distance L along the screw 208 (and thus the guide 204). In the example described, this distance L is divided into guide portions $P_k$ of length Lp and overlapping with a constant Rp overlap between each pair of consecutive $P_k$ guide portions. The overlap Rp can for example be written as:

$$Rp=[PrLp] \qquad \text{[Math. 1]}$$

Pr is an overlap coefficient (e.g. as a percentage) and the operator $\lceil \cdot \rceil$ gives the integer part of what it encloses.

It will be appreciated that the overlap coefficient Pr may be zero, in which case the guide portions $P_k$ do not overlap but are merely contiguous. In other embodiments, the guide portions $P_k$ could be of different lengths from each other and/or separated from each other. The presence of an overlap allows for a finer signal analysis (detailed below) and the determination of any correlations between two adjacent guide portions $P_k$.

Returning to FIG. 4, the monitoring system 110 is designed to seek wear of the actuator 108 from the operating signals obtained.

To this end, the monitoring system 110 further comprises an analysis module 414 designed, for each guide portion $P_k$, to determine an evolution in at least one wear indicator during successive activations of the actuator 108. The one or more predefined wear indicators comprise, for example, one or more of: a standard deviation of the signal portion $X_k(n)$, a skewness coefficient of the signal portion $X_k(n)$, a kurtosis of the signal portion $X_k(n)$, a spectral efficiency value of the signal portion $X_k(n)$. The wear indicator or indicators are subsequently indexed by the letter j, which varies from 1 to J, J being the total number of wear indicators. J may be equal to 1, in which case only one wear indicator is used. Thus, the evolution of the wear indicator j for the guide portion $P_k$ is noted hereafter $E_k^{(j)}$.

In the example described, the analysis module 414 is designed to calculate, for each signal segment $X_k(n)$, a value $V_k^{(j)}(n)$ of each wear indicator j. Thus, the evolution $E_k^{(j)}$ of the wear indicator j for the guide portion $P_k$ is formed by the sequence of these values $V_k^{(j)}(n)$ during a predefined number N of successive activations:

$$E_k^{(j)}=[V_k^{(j)}(1);\ldots;V_k^{(j)}(n);\ldots;V_k^{(j)}(N)] \quad \text{[Math. 2]}$$

In the event that more than one wear indicator is provided, the monitoring system 110 further comprises a module 416 for selecting one of the wear indicators.

In the example described, the module 416 firstly comprises a module 416-1 designed to evaluate, for each wear indicator j, a monotonicity $M_k^{(j)}$ of each evolution $E_k^{(j)}$ of this wear indicator j. For example, the monotonicity $M_k^{(j)}$ has the degree of monotonicity defined in the article by J. Coble and J. W. Hines, "Identifying optimal prognostic parameters from data: a genetic algorithms approach," at Annual conference of the prognostics and health management society, 2009. This degree of monotonicity varies between 0 and 1.

Alternatively, the monotonicity $M_k^{(j)}$ of the wear indicator evolution $E_k^{(j)}$ could be a Pearson coefficient, which is a measure of the correlation between this evolution $E_k^{(j)}$ and time. The Pearson coefficient used is, for example, the one defined in the context of the condition monitoring of the machines in the article by Lei, Y., Li, N., Guo, L., Li, N., Yan, T., and Lin, J. "Machinery health prognostics: A systematic review from data acquisition to RUL prediction," 30 at Mechanical Systems and Signal Processing, 2018.

Alternatively, the monotonicity $M_k^{(j)}$ of the evolution of the wear indicator $E_k^{(j)}$ could be a Spearman correlation, as defined in the same article by Lei et al. The Spearman correlation allows to measure the monotonicity in the case where the degradation is non-linear as a function of time. The Pearson coefficient and the Spearman correlation are for example between −1 and +1.

The selection module 416 further comprises a module 416-2 designed to select one of the wear indicators j from the monotonicity $M_k^{(j)}$ of the wear indicator evolutions $E_k^{(j)}$. Preferably, the module 416-2 is designed to select the wear indicator j with the most monotonous evolutions $E_k^{(j)}$. The selected wear indicator is marked j*.

The monitoring system 110 further comprises a module 418 for detecting and locating wear from the evolutions $E_k^{(j)}$, for respectively the guide portions $P_k$, of the selected wear indicator j* or of the single wear indicator when only one is used (also noted hereafter j*).

In the example described, two methods are implemented in parallel to detect and locate wear. For this purpose, the module 418 comprises, for example, two respective modules 418-1, 418-2.

The module 418-1 is designed to analyse the evolutions $E_k^{(j*)}$ of the wear indicator j* to detect a discontinuity in one or more evolutions of the wear indicator j*, at the same time as a continuity in the evolution of the other one or more evolutions of the wear indicator j*. Indeed, the appearance of wear on the guide 204 more or less suddenly modifies the values of the wear indicator for the guide portion or guide portions where this wear is located. This leads to a discontinuity in the corresponding evolutions of the wear indicator.

On the contrary, for the guide portions without wear, the evolution of the wear indicator remains normally continuous.

To detect a discontinuity, the module 418-1 is designed, for example, to implement a data clustering on points derived from the values of the wear indicator j*.

As is well known, the data clustering consists of searching into how many homogeneous clusters the points can be grouped. For example, the data clustering can be carried out using one of the following methods: K-means, hierarchical clustering and maximum likelihood clustering For example, the module 418-1 carries out a data clustering on the wear indicator values of each guide portion.

If the result of the data clustering for a guide portion is a single cluster, then the evolution of the wear indicator for that guide portion is considered to be continuous, i.e. without discontinuity.

On the contrary, if the result of the data clustering for a guide portion is several clusters, then the evolution of the wear indicator for this guide portion is considered to comprise a discontinuity.

The module 418-1 then compares the results between the guide portions. If a discontinuity appears on only a part of them, the guide 204 is considered to have abnormal wear. If a discontinuity appears on all the guide portions, the motor 206 is considered to have abnormal wear. If none of the guide portions show any discontinuity, the actuator 108 is considered to have no abnormal wear.

Alternatively, the module 418-1 does not carry out a data clustering for each guide portion $P_k$, but rather groups beforehand the guide portions $P_k$, in the example described in successive pairs $P_k$, $P_{k+1}$ (i.e., following each other along the guide 204). Each pair of guide portions thus forms itself a guide portion and the two guide portions that make it up can be described as elementary. The module 418-1 then carries out, for each pair of guide portions $P_k$, $P_{k+1}$, a data clustering on the points respectively associated with the activations of the actuator 108, each point having, as coordinates, the two values of the wear indicator of respectively the two guide portions of the pair for the associated activation. The points used are: $(V_k^{(j*)}(1); V_{k+1}^{(j*)}(1))$, etc., $(V_k^{(j*)}(n); V_{k+1}^{(j*)}(n))$, etc., $(V_k^{(j*)}(N); V_{k+1}^{(j*)}(N))$.

If the result of the data clustering for a pair of guide portions is a single cluster, then the evolutions of these two guide portions are considered continuous.

On the contrary, if the result of the data clustering for a pair of guide portions is several clusters, then this pair of guide portions is considered as discontinuous, i.e. at least one of the evolutions of these two guide portions is considered to contain a discontinuity.

Thus, the module 418-1 then compares the results between the pairs of guide portions. If a discontinuity appears on only one part of them, the guide 204 is considered to have wear. If a discontinuity occurs for all the pairs of guide portions, it is likely that the motor 206 has the detected wear and it can be concluded directly that it does. However, it is possible that this result is achieved with wear on most of the guide portions, and not on the motor 206. Therefore, it is interesting to double the wear detection with the module 418-2.

This module 418-2 is thus designed to analyse the evolutions of the wear indicator j* to detect whether all the evolutions in the wear indicator j* are increasing sharply.

Indeed, with normal wear of the motor 206, it is expected that the wear indicator j* will increase slightly over time, i.e. with successive activations of the actuator, for all the guide portions. However, if the wear indicator j* increases sharply for all the guide portions, this indicates abnormal wear of the motor 206.

For example, in order to determine a sharp increase in an evolution of the wear indicator j*, the module 418-2 is first designed to calculate a standard deviation in an interval of that evolution. Preferably, the interval comprises a predefined number of first values of the wear indicator.

The module 418-2 is then designed to calculate a variation over the entire evolution of the wear indicator j* and to analyse this variation. In the example described, this variation can be calculated from a gradient of the indicator. For a zero gradient, no variation is observed. For a maximum gradient, the variation of the indicator is also maximum. In addition, the analysis of this variation may comprise the comparison of this variation to a threshold. This threshold is for example defined in terms of the standard deviation. For example, this threshold is three times the standard deviation.

If the variation is above the threshold, the evolution is considered to be strongly increasing. Otherwise, the evolution is considered to be increasing normally.

As mentioned above, if the evolutions in the wear indicator j* of all the portions of the guide are considered to be increasing sharply, the motor 206 is considered to have wear. If only some of the evolutions increase sharply, the guide 204 is considered to have wear. If there is no significant increase in the evolution, the actuator 108 is considered to have no abnormal wear.

The module 418 is further designed, in case of a detection of abnormal wear by the module 418-1 or 418-2, to provide a wear detection result R indicating the presence of abnormal wear, as well as on which among the guide 204 and the motor 206 the abnormal wear is present.

It will be appreciated that, in the example described, the monitoring system 110 comprises a computer 420 comprising a processing unit 422, such as one or more microprocessors, and a main memory 424, such as the random access memory, designed to contain computer program instructions and coupled to the processing unit 422 to cause the latter to execute the instructions contained in the main memory 424. The computer 420 further comprises, in the example described, a mass storage 426 in which a computer program 428 is stored, this computer program comprising computer program instructions designed to be loaded into the main storage 424 for execution by the processing unit 422, in order to implement the functions of the modules 412, 424, 416, 418 previously described.

Alternatively, some or all of these functions could be carried out in hardware by predefined micro-wired electronic circuits, without involving a computer program.

With reference to FIG. 6, an example of an embodiment of a method 600 for operating the actuation system 106 will now be described.

For each activation j* of the actuator 108 moving the movable element 202 from its first position to its second position, the following steps 602 to 608 are implemented.

Initially, the movable element 202 is at its first position and the motor 206 is at a standstill.

In a step 602, the motor 206 starts and begins to move the movable element 202 from its first position to its second position.

In a step 604, the acquisition system 406 acquires the measurements from the sensors 402, 404 to provide the operating Si and position Sp signals.

In a step 606, the segmentation module 412 provides the K signal segments $X_k(n)$, measured as the movable element 202 travels, for example according to the position signal Sp, respectively along the K guide portions $P_k$.

In a step 608, the movable element 202 reaches its second position and the motor 206 stops.

Once the actuator 108 has been activated N times, in step 610, the analysis module 414 determines, for each guide portion $P_k$, an evolution $E_k^{(j)}$ of each wear indicator during the successive N activations.

In a step 612, the selection module 416 for selecting a wear indicator selects one of the wear indicators, noted j*.

In a step 614, the module 418 detects wear.

To this end, in a step 616, the module 418-1 carries out, for each pair of consecutive guide portions $P_k$, $P_{k+1}$, a data clustering on the points respectively associated with the activations of the actuator 108.

In a step 618, the module 418-1 determines whether multiple clusters were found for only some of the pairs of guide portions $P_k$, $P_{k+1}$. If this is the case, the presence of wear on the guide 204 is detected.

In a step 620, the module 418-2 determines whether or not the evolutions of the wear indicator for all the guide portions $P_k$ are evolving significantly. If this is the case, the presence of abnormal wear on the motor 206 is detected. If only some of the evolutions in the wear indicator evolve significantly, the presence of abnormal wear on the guide 204 is detected. If none of the evolutions in the wear indicator increase significantly, no abnormal wear of the actuator is detected.

In a step 622, the wear locating module 418 provides the result R of the wear detection, indicating whether the guide 204 and/or the motor 206 has abnormal wear.

This report is, for example, transmitted to a display device in a cockpit of the aircraft 100, or to a display device connected to the aircraft 100 during a maintenance operation.

It will be further noted that the invention is not limited to the embodiments described above. It will indeed appear to the person skilled in the art that various modifications can be made to the above-described embodiments, in the light of the teaching just disclosed.

In the foregoing detailed presentation of the invention, the terms used should not be interpreted as limiting the invention to the embodiments exposed in the present description, but should be interpreted to include all equivalents the anticipation of which is within the reach of the person skilled in the art by applying his general knowledge to the implementation of the teaching just disclosed.

The invention claimed is:

1. A method for monitoring an actuator comprising a movable element, a guide for guiding the movable element and a motor for driving the movable element along the guide, the method comprising:
    for each of the portions of the guide, obtaining an operating signal measured when the movable element travels along the guide portion in question, on each of several successive activations of the actuator;
    for each of the guide portions, seeking wear of the actuator from the operating signals obtained for that guide portion; and
    locating the wear on the guide or on the motor depending on the guide portions from which the wear is found.

2. The method according to claim 1, wherein wear is located on the guide when wear of the actuator is found only on some guide portions.

3. The method according to claim 1, wherein wear is located on the motor when wear of the actuator is found on all the guide portions.

4. The method according to claim 1, wherein, the guide being divided into elementary portions, each guide portion is formed either of a respective one of the elementary portions (Pk) or of a plurality of elementary portions, for example successive along the guide, the elementary portions could overlap to have for example samples in common, or be distinct from each other.

5. The method according to claim 4, wherein each guide portion comprises two consecutive elementary guide portions, wherein each operating signal comprises two elementary operating signals measured as the movable element travels along the two elementary guide portions respectively, the method further comprising:
analysing each elementary operating signal to determine a value for a wear indicator;
and wherein the seek for wear of the actuator for each of the guide portions comprises:
carrying out a data clustering on points respectively associated with the activations of the actuator, each point having, as coordinates, the two values of the wear indicator of the two consecutive elementary guide portions for the associated activation, in order to obtain a number of cluster for the considered guide portion; and
detecting wear for the guide portion under consideration if several clusters are obtained.

6. The method according to claim 4, wherein each guide portion is formed of an elementary guide portion, the method further comprising:
analysing each operating signal to determine a value for a wear indicator;
and wherein the seek for wear of the actuator for each of the guide portions comprises:
analysing a variation in the wear indicator during successive activations; and
detecting wear for the guide portion under consideration from the analysis of the variation.

7. The method of claim 6, wherein the analysis of the variation in the wear indicator comprises the comparison of the variation in the wear indicator to a threshold.

8. A computer program downloadable from a communication network and/or stored on a computer-readable medium, wherein it comprises instructions for the execution of the steps of a monitoring method according to claim 1, when said program is executed on a computer.

9. A system for monitoring an actuator comprising a movable element, a guide for guiding the movable element and a motor for driving the movable element along the guide, this monitoring system being wherein it is adapted to implement a method according to claim 1.

10. An actuation system comprising:
an actuator comprising a movable element, a guide for guiding the movable element and a motor for driving the movable element along the guide; and
a system for monitoring wear of the actuator, according to claim 9.

11. An aircraft comprising an actuation system according to claim 10.

12. Aircraft according to claim 11, comprising a thrust reverser flap and wherein the actuation system is designed for displacing the thrust reverser flap.

* * * * *